Patented Feb. 21, 1950

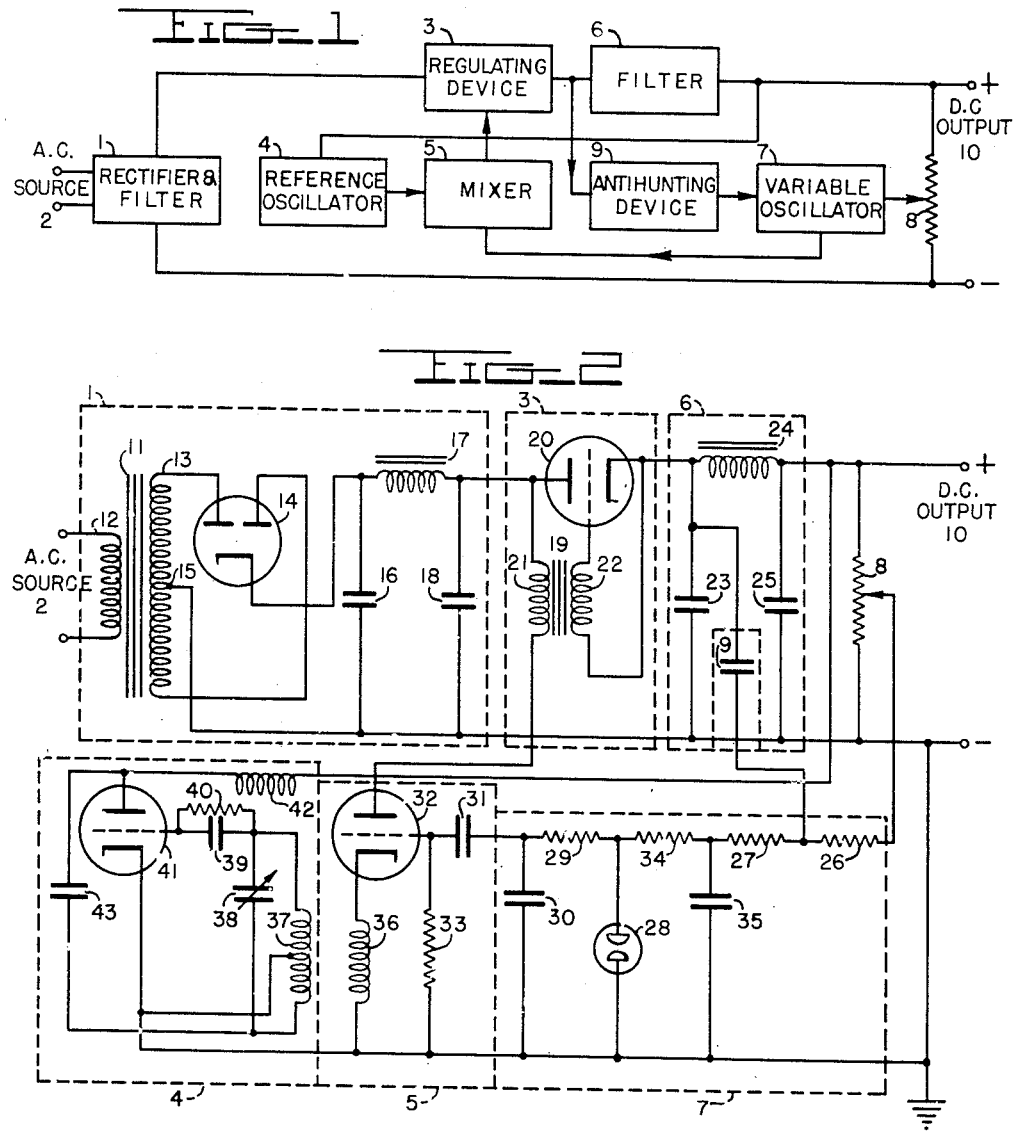

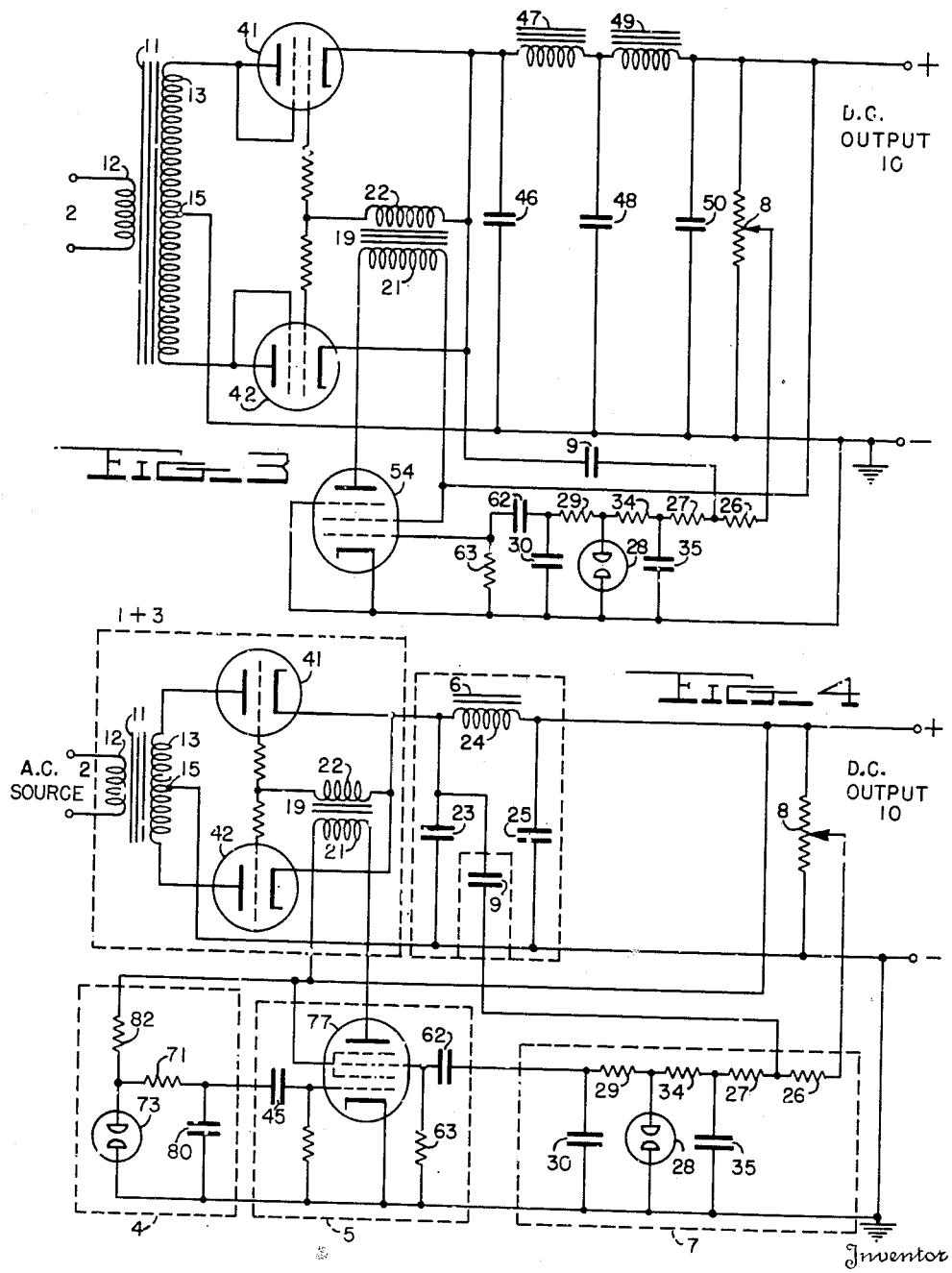

2,497,908

UNITED STATES PATENT OFFICE 2,497,908

SYNCHRONOUS VOLTAGE REGULATOR SYSTEM

La Verne R. Philpott, Washington, D. C.

Application July 1, 1946, Serial No. 680,781

9 Claims. (Cl. 321—40)

(Granted under the act of March 3, 1883, as amended April 30, 1928; 370 O. G. 757)

This invention pertains to voltage regulator systems and more particularly to voltage regulator systems which may be used as direct voltage standards and are controlled by means of a phase comparing device so as to maintain constant voltage across the load.

Other systems of voltage regulation for direct current sources have proved to be unsatisfactory where precision regulation is required for several reasons. Absolute voltage control was not obtainable, a noticeable hunting action sometimes resulted after a compensating voltage change, and a period of operation followed too unstable for precision requirements.

It is an object of this invention to provide a regulating rectifier system that will maintain a substantially constant voltage across the load independently of wide range variations in load currents or in the alternating supply potential.

Another object of the invention is to provide a regulating rectifier system that will maintain constant direct current voltage of such a degree of stableness that it may be used as a secondary standard.

It is another object of this invention to provide a regulating system that will accurately regulate and operate independently of variations in the alternating current supply frequency.

A still further object of this invention is to provide a low impedance direct current power source with an excellent degree of voltage regulation without hunting action by comparing the phase relationship between an alternating reference voltage and an alternate voltage whose frequency is a function of the output voltage level.

A further object of the invention is to provide a regulating rectifier system for furnishing direct current potentials, the stability of which is better than the constancy of the alternating source frequency.

The nature and method of operation of the present invention, together with other objects and features thereof, will appear more fully in the following description, reference being made to the appended drawings, in which:

Fig. 1 is a block diagram of one exemplary embodiment of the invention, Fig. 2 is a detailed circuit diagram of the embodiment shown in Fig. 1, and Figs. 3 and 4 are detailed circuit diagrams of variant embodiments of the invention.

In the embodimet illustrated in Figs. 1 and 2, a grid-controlled tube of the vacuum type is connected as a regulating device in series between the rectified direct current source and the load. A stable master oscillator generating a reference voltage is used along with a second oscillator whose frequency is a function of load voltage. The frequency of the reference oscillator may be many times the line frequency and not commensurate with it; however, the frequency of the variable oscillator must be the same as that of the reference oscillator and locked in an arbitrary phase relationship therewith, when the desired terminal voltage is obtained. The voltage signals of each oscillator are coupled into a mixer stage, the output of which is a function of the two input waves. The phase relation of the two similar oscillatory waves is compared and the output of the mixer stage is applied to the control grid of a vacuum type series control tube as a high-frequency alternating current. The phase relationship of the alternating potentials applied to the mixer tube govern the shape of the wave form placed on the control tube grid and, as hereinafter described, controls the value of the output voltage.

Referring now to the block diagram of the system as shown in Fig. 1, a rectifier and filter unit 1 is connected to an alternating current power source 2 of any suitable frequency. The rectifier and filter may be of any type so long as its current capacity and output voltage is that desired. The positive output line is connected to an electronic regulating device 3 which is in series with the load and, hence, in a position to act as a controlling valve. The reference oscillator 4, of any type, is so constructed that its frequency of operation is constant and is not seriously affected by changes in the load, terminal voltage, or supply frequency. To help achieve this degree of stability the positive direct current voltage supply for the oscillator plate circuit is obtained from the output of the regulator proper. If desired, batteries or any other constant direct current potential source may be substituted for the direct current supply for this oscillator. A second filter network 6 is connected between the regulating device 3 and the load circuit. A so-called variable oscillator 7 is connected across the output 10 of the filter 6 in such a manner that its frequency of oscillation is determined by the terminal voltage of the entire regulator system. A relaxation type of oscillator is best suited for this purpose. The outputs of both the reference oscillator 4 and the variable oscillator 7 are coupled to the mixer 5, in which stage their phase relationship is compared and a voltage representative of the variations of both oscillations is obtained. This voltage is coupled to the controlling elements of the regulating device 3.

Assume that change of load occurs which causes the direct current output voltage 10 of the rectifying and regulating system to decrease. A lower voltage also appears in the variable oscillator 7 so as to cause the output frequency thereof to decrease in proportion to the change of voltage. The voltage oscillations of the variable oscillator 7 are coupled to one controlling element of the mixer tube while the signal of the reference oscillator 4 is coupled into another element of the mixer 5. In this stage the two oscillatory waves are compared in phase and the effect of each is combined into one output voltage. Under conditions of normal regulated voltage output, the two oscillatory potential waves fed to the mixer 5 are of the same frequency and comparable amplitude, but not necessarily in phase. The relative phase position, however, does not change when a constant output potential is provided. This relationship results in normal operating voltages on the mixer 5. However, should the output potential drop, the frequency of the variable oscillator 7 will decrease, while that of the reference oscillator 4 will remain sensibly constant. The apparent phase shift between the oscillatory waves results in an increased duty factor which results in a shift of wave form of the output voltage, causing the regulating device 3 to pass a higher average current. This increase of current raises the terminal output potential to its previous value. Similarly, if the terminal voltage increases due to a change of load, the frequency of the variable oscillator 7 will also increase. During the frequency change the phase relationship of the two oscillatory waves will shift in the mixer 5, causing a reversed operation from that described above. It may take several cycles for this corrective action to be completed, which in some cases may be slower than the corrective action of conventional voltage regulators. However, the corrective action of this device restores the voltage to exactly its former magnitude and does not require, as in other systems, a constant error signal to actuate the correcting process.

Since the filter unit 6 will ordinarily greatly attenuate and delay the passage of any voltage transient through it, the regulating device will have fully compensated for any terminal voltage change before the voltage rise will become apparent at the variable oscillator 7. To prevent the regulating device from overcompensating on a voltage change, an anti-hunting device 9 is incorporated in the circuit. This device is connected ahead of the filter unit 6 so that any voltage change appearing on the output side of the regulating device 3 will immediately be apparent at the input to the variable oscillator 7. Thus the variable oscillator will return to its normal frequency before the terminal voltage reaches its normal value and prevent the occurrence of hunting or over-compensating action.

If desired a means for varying the value of the regulated output voltage may be utilized. By controllably changing the potential fed to the relaxation oscillator 7, the frequency of this oscillator will be changed. Use of the potentiometer 8 is one of several means achieving this end. The action which follows is identical with that occuring during normal regulation action of the system. The phase shift appearing in the mixer 5 causes a controlling voltage to so govern the regulating device 3 that the output voltage will change to that value which will keep the variable oscillator 7 operating at the same frequency as the reference oscillator 4. The two oscillatory waves will be locked in at the same frequency, but the relative phase position will be somewhat different than in the previous output voltage conditions. It is also obvious that the value of the output voltage may be changed by operating the reference oscillator 4 at a different frequency. This requires that the output voltage must change in order that the variable oscillator 7 will operate at the same frequency as the reference oscillator. A variable condenser or inductance may be used in the oscillator circuit to vary the frequency if the reference oscillator 4 is of the tuned circuit type, or a crystal of a different frequency may be inserted if the oscillator is of the crystal controlled type. From the foregoing discussion it may be seen that the output voltage will be changed, or regulated, as long as a changing phase relationship exists between the two oscillatory waves in the mixer, and that a constant voltage output will be obtained when the two oscillatory waves are locked in at the same frequency, but have some arbitrary constant phase relation. It should be further noted that not only could any suitable rectifier be substituted for block 1, but also a direct current source such as a supply line could be substituted and applied directly to the regulating device. It will also be noted that the ripple frequency of the voltage applied to filter 6 is determined by the frequency of the stable oscillator 4. Therefore the size and cost of the components of the filter 6 can be materially reduced by operating the stable oscillator 4 at a relatively high frequency.

A detailed showing of one exemplary embodiment of the regulating and rectifier circuits shown in Fig. 1 is illustrated in Fig. 2. The various sections or units comprising the entire regulator are enclosed by dotted lines and are designated by numbers corresponding to those used in Fig. 1. Referring now to Fig. 2, the rectifier and filter unit 1 consists of a conventional full wave power rectifier, having the primary winding 12 of the power transformer 11 connected to the alternating current source 2. The two ends of the secondary winding 13 are respectively connected to the plates of the full-wave rectifier tube 14, and the centertap 15 of the secondary winding 13 is brought out as the negative direct current bus. The cathode of the rectifier tube 14 is connected to the positive input terminal of an inductance-capacitance pi filter network consisting of the filter condensers 16 and 18 connected in parallel with the load circuit, and the filter inductance or choke 17 connected in the positive bus and in series with the load circuit. Other types of filter networks may be utilized, but the inductance-capacitance pi network is customarily used where good filtering is desired.

The rectifier and filter output is connected to the plate of the triode vacuum tube 20 of the regulating device 3. The cathode of the regulating tube 20 is connected to the input of a second inductance-capacitance pi filter section 6 consisting of the filter inductance or choke 24 and the two filter condensers 23 and 25. The regulating tube, therefore, is connected in series with the source and the load in such a manner as to operate as a flow valve or switch. The grid of the regulating tube 20 is connected to one side of the secondary winding 22 of the coupling transformer 19, the other side of the secondary winding 22 being fastened to the same direct current potential, the tube 20 normally will operate at zero grid bias.

The variable relaxation oscillator 7 comprises a charging condenser 30, a gas discharging tube 28, charging resistor 34, discharging resistor 29, and a filter and isolating network. The oscillator 7 obtains its operating potential from a high resistance bleeder consisting of the variable potentiometer 8 across the direct current output lines. The movable tap of the potentiometer 8 is connected to the input of the relaxation oscillator so that by setting various charging potentials, the output voltage of the regulator may be adjusted. An input or isolating resistor 26 is utilized to prevent any transient potential passing through the anti-hunting device 9 from appearing in the load circuit. Condenser 9, the anti-hunting device, is connected between the cathode or output of the regulating tube 20 and the oscillator end of the isolating resistor 26. Since it is connected in effect across the inductance-capacitance filter 6, the ripple component which is inherent in a full-wave rectifier and any transient phenomena are passed on toward the oscillator circuit. However, resistance 27 and condenser 35 constitute a filter network which effectively removes the ripple voltage. The variable oscillator proper consists of the charging current limiting resistor 34, the neon gas discharge tube 28, the discharging current limiting resistor 29, and the charging condenser 30. The oscillatory rise and fall of the voltage across the charging condenser 30 is connnected through the coupling condenser 31 to the control grid of a triode mixer tube 32. The resistor 33 provides the grid leak path to ground potential.

The reference oscillator 4 employs the conventional Hartley oscillator circuit. A triode vacuum tube 41 is used, the plate of which is coupled by means of a condenser 43 to one end of the tank coil 37. The other end of the tank coil 37 is connected through the grid leak resistor 40 and condenser 39 to the grid of the oscillator tube 41. The tap on the tank coil 37 is fastened to the cathode of the tube 41, both being directly connected to the negative potential or ground bus. A variable condenser 38 is connected across the ends of the tank coil 37, thus providing an additional method of setting the output voltage value. A condenser of fixed capacity may be used if this feature is not desired. The positive operating potential for the reference oscillator is obtained from the output 10 of the system, a regulated voltage being used to assure constancy of the oscillator frequency. The plate potential is fed through a choke 42 of such a size that the oscillatory voltage will be suppressed and will not appear in the regulated output 10.

Mutual inductance between the oscillator tank coil 37 and a coupling coil 36 in the cathode circuit of the triode mixer tube 32 transfers the voltage changes of the oscillatory waves to the mixer circuit. The actions of the two oscillatory waves, i. e., those of the reference oscillator and those of the variable oscillator, are combined, the voltage variations appearing in the plate circuit being representative of the effect of each wave. The mixer tube, in other words, compares the phase relationship of the two oscillatory waves, the resulting plate voltage variations being indicative of this comparison. The primary coil 21 of the coupling transformer 19 is connected in the plate supply line of the mixer tube 32 as the load element. Any voltage variation across the primary winding 21 is immediately evident across the secondary winding 22 of the coupling transformer, and, hence, also appears on the grid of the regulating tube 20.

The anti-hunting device 9 is so connected in the circuit as to prevent an over-compensating or hunting action from occurring during voltage correction. This device consists merely of a condenser connected between the cathode of the regulating tube 20 and the input to the variable oscillator circuit 7. Thus any rise or fall of voltage occurring at the cathode of the regulating tube 20 will be immediately apparent at the variable oscillator 7 and the oscillator will then readjust its frequency of operation to its former normal value. The anti-hunting device is necessary because of the delay in transmission of any voltage transient through the filter 6, which would permit the control system to continue compensating after a sufficient change had already been made. This would result in the changing voltage "overshooting" its mark and, hence, would require another change in the opposite direction for compensation.

An alternate embodiment of the invention providing voltage regulation better than the frequency stability of the alternating source frequency is illustrated in Fig. 3. In this embodiment of the invention the rectifier 1 and regulating device 3 of Fig. 1 is replaced by a grid-controlled rectifier system, in which a grid-controlled rectifier tube is used for each phase being rectified and the reference frequency source is in this case the supply source. In this discussion the number of phases being rectified is considered equal in number to the number of legs existing in the input power transformer secondary reckoned from the common negative terminal. The grids of the rectifier tubes are connected together and are driven at a frequency equal, in general, to the line frequency times the number of phases rectified. The grid driving potential of the rectifier tubes is approximately a square voltage wave derived from the variable oscillator operating at the proper frequency and squared-up in an overdriven buffer amplifier. The variable oscillator is again so connected to the output of the rectifier system that its frequency will change with the output potential of the direct current power source. As a result of the operation of the control circuit the output potential of the rectifier will remain at that value which will keep the variable oscillator generating a frequency which is an exact multiple of the supply frequency. The stability of the system is inherently more stable than the alternating supply frequency, as is shown below.

Referring now to the drawing, a power transformer 11 has its primary winding 12 connected to a source of alternating current potential. The two ends of the secondary winding 13 are respectively connected to the plates of electronic tubes 41 and 42. The cathodes of said tubes are connected together, a common point thereof being connected to the positive input terminal of a double pi inductance-capacitance filter network consisting of filter condensers 46, 48, and 50 connected in parallel and filter inductances or chokes 47 and 49 connected in series with the load circuit. Other types of filter networks may be used, but the inductance-capacitance pi network is customarily utilized where fairly good filtering is desired. The center tap 15 of the power transformer secondary winding 13 is brought out and serves as the negative terminal of the direct current power source. Omitting for the moment the grids of the rectifying tubes 41 and 42 and the transformer 19 as shown in the drawing, the circuit so far described is that of the customary full wave single phase rectifier denoted herein as a two phase rectifier. Heater connections and transformer windings are not shown for purposes of simplification. In this fundamental circuit, however, a slight change in load current or in the alternating input voltage will cause a corresponding change in terminal voltage across the output lines of the rectifying direct current source. It is the purpose of the circuit as described by the invention to prevent a change of load or a variation in the alternating line voltage from permanently influencing the terminal voltage.

To accomplish proper regulation, grid-controlled rectifying tubes are used in conjunction with an automatic control circuit. The control circuit again comprises; a relaxation oscillator including condenser 30 and gas tube 28, arranged as described above, so that its frequency is dependent upon the terminal voltage. A buffer amplifier 54 is provided to amplify the control oscillations, and a transformer 19 for coupling the oscillations to the rectifier control grids. The voltage change across condenser 30 is connected through coupling condenser 62 to the grid of the amplifying tube 54. The grid leak resistor 63 is connected between the grid of tube 54 and the negative direct current line. Both the cathode and the suppressor grid may be connected directly to or through a suitable network to the negative line. The plate of the amplifier tube 54 is connected to one side of the primary winding 21 of the coupling transformer 19, the other side of the primary winding being connected to the positive direct current supply potential. The screen grid of the amplifier tube 54 is also connected to the positive potential. The secondary 22 of the coupling transformer 19 is connected one end to the two control grids and the other end to the two cathodes of the grid-controlled rectifier tubes 41 and 42.

For purposes of illustrating the operation of such a regulating circuit, it is assumed that the rectifier is operating in its proper manner. A change of load on the output terminals of the direct current supply causes the output voltage to drop. A corresponding drop of voltage appears across the bleeder resistance 8, and hence, a lower voltage is fed through the isolating resistor 26 to the oscillator. The frequency of the relaxation oscillator, will decrease since the potential toward which the condenser 30 charges has decreased, thus increasing the time for the potential across the condenser 30 to reach the firing value of the gas discharge tube 28. An oscillatory voltage wave of approximately sawtooth form thus appears in the oscillator circuit. The voltage change or oscillation of the condenser 30 is coupled through the coupling condenser 62 to the control grid of the buffer amplifier tube 54. The sawtooth oscillatory potential on the grid is of such a value as to drive the amplifier tube 54 alternately to saturation and then to cut-off, thus causing a potential of approximately square wave proportions to appear in the plate circuit of this tube. The square wave variations are connected through the coupling transformer 19 to the grids of the grid-controlled rectifier tubes. As the frequency of the oscillator decreases due to a decrease of output potential, a phase shift of the square wave relative to the supply voltage applied to the plates of the rectifier tubes is evident. The phase shift of the grid signal with respect to the steady phase of the alternating current plate signal produces a larger duty factor in the rectifier tubes which causes the tubes to draw more plate current, thus causing a higher average direct current potential to appear at the cathodes. The rise of potential is reflected through the inductance-capacitance filter network and thence to the load, thus returning the terminal voltage to its former value.

It will be here recognized that the oscillator signal applied to the grids of the rectifiers will lock in a certain phase relationship relative to the plate reference signal applied by the secondary winding 13 of the power transformer 11 with the result that the output potential will be determined by the stability of the supply frequency. Any change in the latter, of course, will change the output potential, but by a percentage which can be much less than the percentage change of frequency.

In this country, however, and in various other places throughout the world the commercial electrical power frequency is held constant within very small limits, so that satisfactory operation may often be obtained when the unit is connected to a commercial alternating current source.

To operate the system with a voltage stabilization considerably better than that of the line frequency, it should be so constructed that the desired output voltage is obtained when the variable gas tube oscillator is fired near the top of the charging curve of condenser 30. Since the sawtooth output voltage of said oscillator is determined by said condenser's voltage fluctuations between the firing and extinguishing potentials of said gas tube, and the fluctuations consist of a rise along the condenser's charging path from the extinguishing voltage to the firing voltage and then a sharp decline as the condenser is discharged back to the extinguishing voltage, the time spent in rising through a fixed voltage is considerably greater near the flat part of the charging curve. The frequency of the oscillator is of course a function of the time required for the condenser to charge between the two said voltage levels, and an equal change in the voltage toward which the condenser charges will occasion greater change in said required charging time at points along the flat part of the charging curve than at points along the steep part. Therefore, operation along the flatter part of the charging curve amplifies the frequency variation produced by a variation in the charging voltage. This response amplification will diminish as the slope at the operating points increases until it is one to one along the linear portion of the curve. Thus, at no point of operation can the stability of the system be less than the stability of the line voltage, and it can be considerably greater.

An increase in terminal voltage will cause an opposite reaction to take place resulting in a lowering of voltage to the normal value.

Still another embodiment of the invention somewhat simpler than that in Fig. 2 is shown in Fig. 4. The various sections or units comprising the entire regulator are enclosed by dotted lines and are numbered to indicate their relationship to the block diagram in Fig. 1. It will be noted that the rectifier 1 and the regulating device 3 are combined in this embodiment into one unit and no filter is needed in connection with this rectifier. This is accomplished by using grid controlled rectifier tubes 41 and 42 in a full-wave rectifier arrangement and feeding the voltage compensating signal to the respective control grids of these tubes, said grids being tied together.

Another point of difference between this circuit and that of Fig. 2 is the reference oscillator 4, In this embodiment a simple relaxation oscillator is substituted for the Hartley oscillator. It comprises a gas tube 73 for discharging through a limiting resistor 71 the condenser 80. Said condenser is charged by the stable output voltage through resistance 82. It is essential that the reference oscillator 4 be tied to a higher potential than the variable relaxation oscillator 7 so that the stable oscillator will be operating along the linear portion of its charging curve. This may be effected by the variable tap on the bleeder resistance 8 exciting the variable oscillator 7. The remaining point of difference in this circuit over Fig. 2 lies in the mixer 5. This circuit employs a tube 77 with two control grids and the two oscillator outputs are capacity coupled each to a separate control grid of this tube 77. The output of the mixer is then transformer coupled to the grids of the grid controlled rectifier tubes 41 and 42. In other respects the operation of this circuit is the same as the one in Fig. 2.

Thus there has been described a voltage regulated rectifying system for use as a direct current source of constant potential. The degree of regulation is extremely close and fast-acting so that the unit may be used as a source standard of unvarying potential, or wherever a regulated direct current potential is desired. Changes and modifications in the control circuits shall not be construed to depart from the intent of the invention as set forth in the appended claims.

The invention described herein may be manufactured and used by or for the Government of the United States of America for governmental purposes without the payment of any royalties thereon or therefor.

What is claimed is:

1. A synchronous voltage regulator system for providing direct current potentials to a load circuit from an unregulated power source, comprising a voltage regulating element connected between said power source and said load circuit operative to control the voltage to said load circuit in response to the wave shape of a control signal, a reference frequency source, a variable-frequency oscillator connected to the output of said voltage regulating element, said oscillator being free to change its frequency in accordance with variations in the output voltage level from said regulator system, circuit means applying both the output from said oscillator and said reference frequency source to said voltage regulating element as the control signal.

2. A synchronous voltage regulator system for providing direct current potentials to a load circuit from an unregulated power source, comprising a vacuum tube voltage regulating element connected between said power source and said load circuit operative to control the voltage to said load circuit in response to the wave shape of a control signal, a reference frequency source, a variable-frequency oscillator connected to the output of said voltage regulating element, said last-named oscillator being free to change its frequency in accordance with variations in the output voltage level from said regulator system, circuit means applying both the output from said oscillator and said reference frequency source to said vacuum tube voltage regulating element as the control signal.

3. A synchronous voltage regulator system for providing direct current potentials to a load circuit from an unregulated power source, comprising a control means connected between said power source and said load circuit operative in response to a control signal for maintaining the voltage at said load circuit constant, said control means comprising vacuum tube means having at least one control element associated therewith, a constant frequency oscillator, a variable frequency oscillator connected to the output of said control means, said last-named oscillator being free to change its frequency in accordance with variations in the output voltage level from said regulator system, and a mixer unit to compare the phase relationships of said variable-frequency oscillator and said constant-frequency oscillator, said control signal being obtained from the output of said mixer unit and representative of both oscillator frequencies and being applied to said control means to maintain the output voltage at such a value as to hold the frequency of said variable-frequency oscillator in a predetermined relationship with the frequency of said constant-frequency oscillator.

4. A synchronous voltage regulator system for providing direct current potentials to a load circuit from an unregulated power source, comprising a control means connected between said power source and said load circuit operative in response to the waveform of a control signal for maintaining the voltage at said load circuit constant, a constant-frequency oscillator, a variable-frequency relaxation oscillator connected to the output of said control means, said last-named oscillator being free to change its frequency in accordance with variations in the output voltage level from said regulator system, and a mixer unit to compare the phase relationships of said variable-frequency oscillator and said constant-frequency oscillator, the output of said mixer unit having a waveform representative of the phase relationships of both oscillator frequencies and being applied to said control means as the aforesaid control signal to maintain the output voltage at such a value as to hold the frequency of said variable-frequency oscillator in a predetermined relationship with the frequency of said constant-frequency oscillator.

5. A synchronous voltage regulator system for providing direct current potentials to a load circuit from an unregulated power source, comprising a control means connected between said power source and said load circuit operative in response to the waveform of a control signal for maintaining the voltage at said load circuit constant, said control means consisting of a triode vacuum tube connected in the positive potential bus in series between said direct current source and said load circuit, a constant-frequency oscillator, a variable-frequency oscillator connected to the output of said regulator system through a resistance-capacitance isolating and filter network, said last-named oscillator being capable of changing its frequency in accordance with variations in the output voltage level from said regulator system, a mixer unit to compare the phase relationships of waveforms from said variable-frequency oscillator and said constant-frequency oscillator, the output of said mixer unit having a waveform representative of the phase relationships of both oscillator frequencies and being applied to said control means as the aforesaid control signal to maintain the output voltage at such a value as to hold the frequency of said variable-frequency oscillator in a predetermined relationship with the frequency of said constant-frequency oscillator, and anti-hunting means, said anti-hunting means comprising a condenser connected between the cathode of said vacuum tube control means and said variable frequency oscillator.

6. In a voltage regulator system, an alternating current supply circuit, grid-controlled rectifier means connected to said supply circuit, an oscillator connected to the output of said grid-controlled rectifier means, said oscillator being operative to change its frequency in accordance with variations in the output voltage level from said grid-controlled rectifier means, and control means operative to so regulate the conductivity of said grid-controlled rectifier means in response to the output signal from said oscillator as to maintain the output voltage from said grid-controlled rectifier means constant.

7. In a voltage regulator system, an alternating current supply circuit, grid-controlled rectifier means connected to said supply circuit, a relaxation oscillator connected to the output of said grid-controlled rectifier means, said relaxation oscillator being operative to change its frequency in accordance with variations in the output voltage level from said grid-controlled rectifier means, and control means operative to so regulate the conductivity of said grid-controlled rectifier means in response to the output signal from said relaxation oscillator as to maintain the output voltage from said grid-controlled rectifier means constant.

8. In a voltage regulator system, an alternating current supply circuit, grid-controlled rectifier means connected to said supply circuit, an oscillator connected to the output of said grid-controlled rectifier means, said oscillator being operative to change its frequency in accordance with variations in the output voltage level from said grid-controlled rectifier means, and control means operative to so regulate the conductivity of said grid-controlled rectifier means in response to the output signal from said oscillator as to maintain the output voltage from said grid-controlled rectifier means constant, said control means comprising a transformer, the primary winding of which is connected in the output circuit of said oscillator and the secondary of which is connected between the control grid and the cathode of said grid-controlled rectifier means.

9. In a voltage regulator system, an alternating current supply circuit, grid-controlled rectifier means connected to said supply circuit, an inductance-capacitance filter network, a voltage output terminal connected to the rectifier output through said inductance-capacitance filter network, an oscillator connected to said output terminal through a resistance-capacitance isolating and filter network, said oscillator being operative to change its frequency in accordance with variations in the output voltage level from said grid-controlled rectifier means, control means operative to so regulate the conductivity of said grid-controlled rectifier means in response to the output signal from said oscillator so as to maintain the output voltage from said grid-controlled rectifier means constant, and anti-hunting means, said anti-hunting means comprising a condenser connected between the output of said grid-controlled rectifier means and an intermediate point in said resistance-capacitance isolating and filter network.

LA VERNE R. PHILPOTT.

REFERENCES CITED

The following references are of record in the file of this patent:

UNITED STATES PATENTS

| Number | Name | Date |
| --- | --- | --- |
| 1,987,976 | Roberts | Jan. 15, 1935 |
| 2,195,121 | Moyer | Mar. 26, 1940 |
| 2,197,934 | Koch | Apr. 23, 1940 |
| 2,318,644 | Tubbs | May 11, 1943 |

FOREIGN PATENTS

| Number | Country | Date |
| --- | --- | --- |
| 438,522 | Great Britain | Nov. 14, 1935 |